United States Patent [19]
Sada et al.

[11] Patent Number: 5,777,225
[45] Date of Patent: Jul. 7, 1998

[54] CRASH SENSOR

[75] Inventors: Hiroyuki Sada; Hiroshi Moriyama, both of Chiyoda-machi, Japan

[73] Assignee: Sensor Technology Co., Ltd., Kobe, Japan

[21] Appl. No.: 633,759

[22] PCT Filed: Oct. 13, 1994

[86] PCT No.: PCT/JP94/01724

§ 371 Date: Jun. 24, 1996

§ 102(e) Date: Jun. 24, 1996

[87] PCT Pub. No.: WO95/12505

PCT Pub. Date: May 11, 1995

[30] Foreign Application Priority Data

Nov. 2, 1993 [JP] Japan ................................ 5-297221

[51] Int. Cl.$^6$ ................................ B60R 21/32
[52] U.S. Cl. ................ 73/488; 180/282; 280/735; 340/436; 701/45; 701/70
[58] Field of Search ................ 73/488; 180/271, 180/282; 280/735; 340/436; 701/45, 70

[56] References Cited

U.S. PATENT DOCUMENTS

| | | | |
|---|---|---|---|
| 4,994,972 | 2/1991 | Diller. | |
| 5,189,311 | 2/1993 | Moriyama et al. | 307/10.1 |
| 5,225,985 | 7/1993 | Okano. | |
| 5,389,822 | 2/1995 | Hora et al. | 701/45 |
| 5,396,424 | 3/1995 | Moriyama et al. | 340/436 |
| 5,497,327 | 3/1996 | Takaya et al. | 340/436 |
| 5,506,775 | 4/1996 | Tsurushima et al. | 701/45 |
| 5,508,920 | 4/1996 | Gioutsos et al. | 701/45 |
| 5,544,915 | 8/1996 | Fendt et al. | 280/735 |
| 5,608,628 | 3/1997 | Drexler et al. | 701/45 |
| 5,629,847 | 5/1997 | Shirakawa et al. | 701/45 |
| 5,631,834 | 5/1997 | Tsurushima et al. | 701/45 |
| 5,638,274 | 6/1997 | Konishi et al. | 701/45 |

FOREIGN PATENT DOCUMENTS

| | | |
|---|---|---|
| 0 327 853 | 8/1989 | European Pat. Off. |
| 0 511 556 | 11/1992 | European Pat. Off. |
| 42 08 714 | 9/1992 | Germany. |
| 42 39 585 | 5/1993 | Germany. |
| 43 00 351 | 7/1993 | Germany. |
| 43 03 774 | 9/1993 | Germany. |
| WO 90/09298 | 8/1990 | WIPO. |
| WO 93/21043 | 10/1993 | WIPO. |

Primary Examiner—George M. Dombroske
Assistant Examiner—Eric S. McCall
Attorney, Agent, or Firm—Oblon, Spivak, McClelland, Maier & Neustadt, P.C.

[57] ABSTRACT

A crash sensor including an accelerometer, a calculation device, a comparator, a trigger circuit, a physical quantity calculation device, and an adjusting device. The accelerometer develops an acceleration signal and the calculation device calculates a first value corresponding to a magnitude of deceleration based on the acceleration signal. The comparator compares the first value and the trigger circuit actuates a protective device, such as an air bag, upon receiving the trigger signal from the trigger circuit. The physical quantity calculation device calculates a magnitude of physical quantities in a wave defined by acceleration signals during an initial stage of a crash. The adjusting device adjusts at least one of the first value corresponding to the magnitude of deceleration and the threshold value used by the comparator on a basis of the magnitude of physical quantities.

7 Claims, 14 Drawing Sheets

Fig. 10
(a)
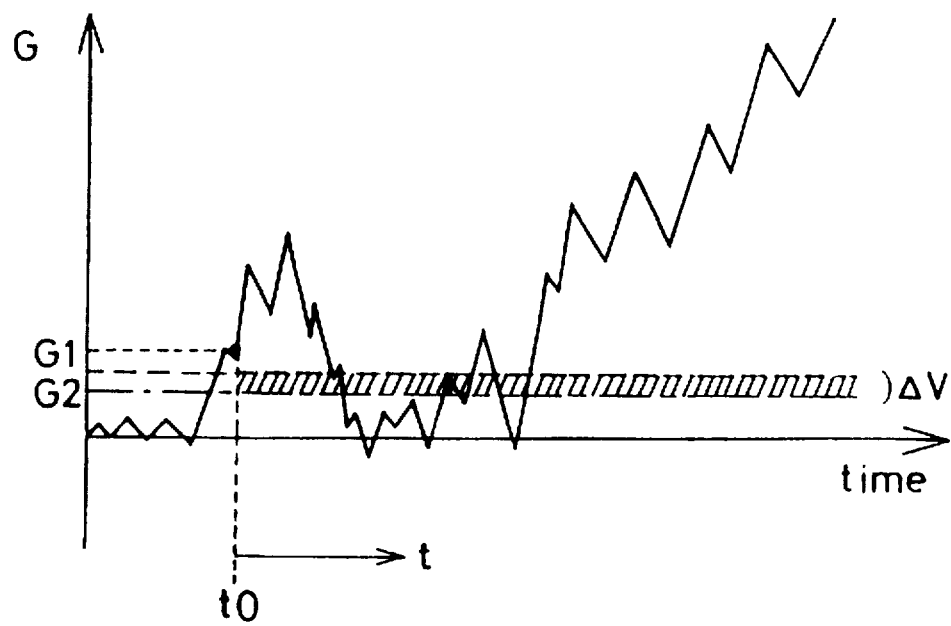
(b)
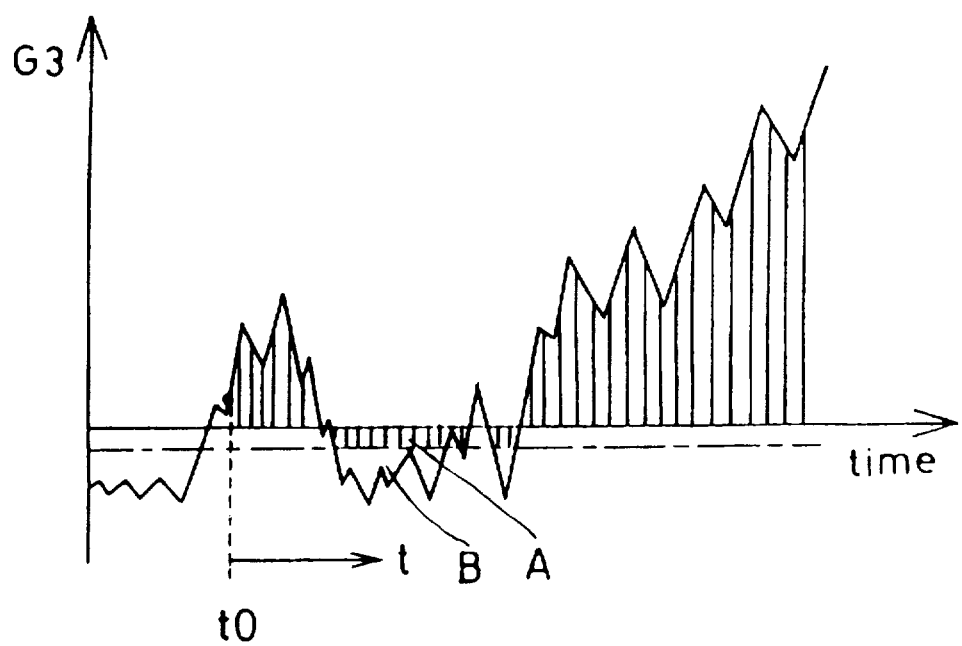

CRASH SENSOR

FIELD OF THE INVENTION

The present invention relates to a crash sensor suitable for sensing a crash of a vehicle and for being incorporated in a system for actuating a protective device such as an air bag provided for the safety of a vehicle occupant, and more particularly to a crash sensor capable to judge whether the protective device should be actuated or not in an intial stage of the crash.

BACKGROUND OF THE INVENTION

A most common type of a crash sensor applies a microcomputer for judging on a severity of a crash, wherein an acceleration signal outputted from an accelerometer is integrated with respect to time every time and then the time integrated value is compared with a prescribed reference value for judging the severity of a crash.

That is to say, the acceleration signal outputted from the accelerometer is integrated with respect to time as shown in FIG. 13 by areas provided with oblique and vertical lines. The protective device is actuated when the time integrated value has come up to the reference value V0 as shown in FIG. 14, while the protective device is not actuated as long as the time integrated value is smaller than the reference value V0 (as disclosed in U.S. Pat. No. 3,701,903 and Japanese Laid Open Patent Application No. 49-5501).

Dot-dash and solid curves in FIGS. 13 and 14 represent how the acceleration and the aforesaid time integrated value vary with time under the condition that oblique crashes occurs with high and intermediate speeds respectively. In order to insure the safety of a vehicle occupant, the protective device has to be actuated during the time T requiring an actuation of a protective device. In case of the oblique crash with high speed, the aforesaid time integrated value comes up to the reference value V0 at a time (tF) which falls within the time T requiring the actuation of the protective device, and the prior crash sensor actuates the protective device at an opportune moment. However, in case of the oblique with intermediate speed, the aforesaid time integrated value does not come up to the reference value V0 within the time T requiring actuation of the protective device, but comes up at a time tF' after a lapse of the time T requiring the actuation. This causes the prior crash sensor to actuate the protective device at an inopportune moment. Thus, in some types of the crash, the prior crash sensor unavoidably introduces a time delay into the system for actuating the protective device.

The prior crash sensor has another disadvantage that it is not capable of making a sharp distinction between the oblique crash occurring with intermediate speed and a head-on crash occurring with low speed during the time T requiring actuation of the protective device. The oblique crash with intermediate speed requires the actuation of the protective device while the head-on crash with low speed does not require the actuation of the protective device. This disadvantage is derived from the fact that the difference between the solid curve and a dashed curve in FIG. 14 is not very great in the initial stage of each crash.

There is another prior crash sensor wherein a displacement and a speed of an occupant's head are predicted on the basis of an acceleration signal output from an accelerometer so that an air bag may be sufficiently inflated before the occupant strikes against the air bag.

This crash sensor judges on the timing of actuation from such a predicted displacement as the occupant would travel in a vehicle during 30 milli-seconds after a crash occurred. The 30 milli-seconds which are the time required for inflating the airbag sufficiently.

This crash sensor also judges whether the air bag should be inflated or not from whether a secondary crash will injure the occupant As an energy of the secondary crash is determined by the speed of the occupant traveling in the vehicle at the moment of the secondary crash. So, this crash sensor judges on necessity of the actuating the air bag from such a predicted speed as the occupant would travel in the vehicle during 30 milli-seconds after the crash occurred.

However, it is difficult to judge whether the air bag should be inflated or not from only the predicted speed of the traveling occupant. Whatever the speed of the traveling occupant at the 30 milli-seconds after the crash occurred was predicted perfectly, a judgment on a necessity of actuation would still include an error. Therefore, a significant disadvantage is that this crash sensor lacks reliability.

In view of the above-described problems, the primary object of a present invention is to provide a crash sensor capable-of making a sharp distinction between the oblique crash with intermediate speed which requires the actuation of a protective device and the head-on crash with low speed which does not require the actuation of the protective device so as to give a judgment on necessity of actuating the protective device in an initial stage of the crash.

SUMMARY OF THE INVENTION

The present invention generally has two types of a crash sensor. In accordance with one type, the crash sensor includes calculation means for calculating a first value on the basis of an acceleration signal from an accelerometer, the first value corresponds to a magnitude of deceleration, comparator means for comparing the first value with a threshold value and producing a trigger signal when the first value exceeds the threshold value, and a trigger circuit for actuating a protective device such as an air bag on receipt of the trigger signal from the comparator means, wherein a magnitude of physical quantities in a first wave formed with crash decelerations is calculated for the purpose of adjusting the first value and/or the threshold value on the basis of the magnitude of physical quantities so as to overestimate the crash.

In accordance with the other type, the present crash sensor calculates a first value on the basis of an acceleration signal from an accelerometer, the above first value corresponds to a magnitude of deceleration, compares the first value with a threshold value for determining a timing of actuation and calculates magnitude of physical quantities in a first wave formed with crash decelerations for the purpose of judging whether a safety device should be actuated or not.

A magnitude of physical quantities in the first wave of the decelerations during the head-on crash with low speed is small because most of the energy caused by the head-on crash with low speed is absorbed by bumpers as the absolute value of energy caused by the head-on crash with low speed is small compared with that of energy caused by an oblique crash with high or intermediate speed.

Therefore, it will be understood that a crux of the invention is that a means for estimating the aforesaid physical quantity is incorporated in the conventional crash sensor so that the protective device may be actuated without fail in an initial stage of such a gentle crash as an oblique crash with intermediate speed.

BRIEF DESCRIPTION OF THE DRAWINGS

FIG. 10 is another graphical representation useful in understanding the same.

BEST MODES OF OPERATION

The following description is based on the assumption that the magnitude of deceleration assumes a positive value. However, should it be at any time desired to have the deceleration deliberately referred to as being negative, changes in the specification and drawings may be made accordingly without departing from the concept of the invention and the scope of the appended claims.

Figure 1:
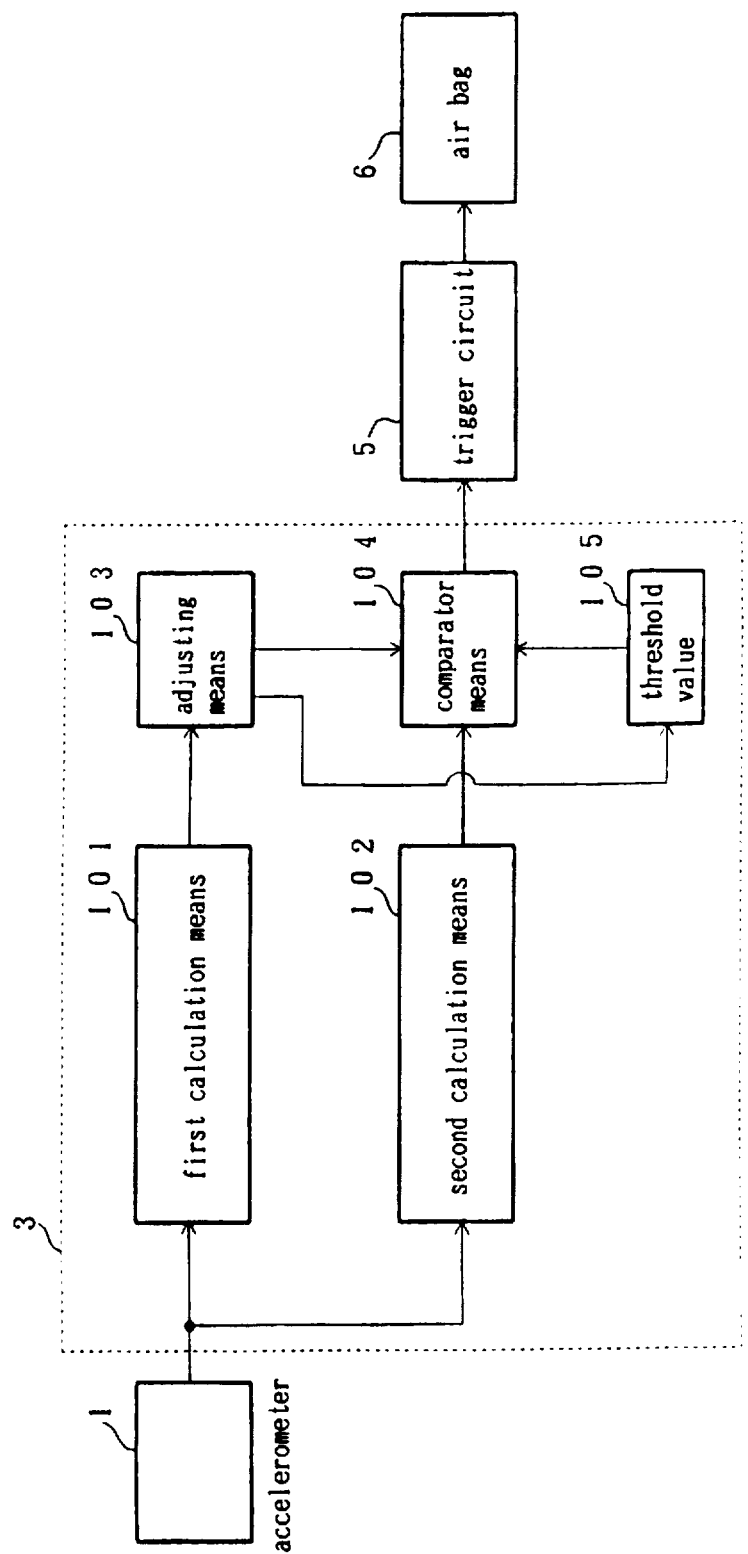
FIG. 1 provides a diagrammatic illustration of a crash sensor in accordance with the invention.

Reference will now be made to FIG. 1, wherein the first of the aforesaid two types is clearly shown. Physical quantities obtained in a first wave formed with crash decelerations is used for an overestimation of a crash. Three examples of a crash sensor embodying this type will appear hereinafter as the first, second and third embodiments.

As shown in FIG. 1, an accelerometer 1 is connected to a trigger circuit 5 through a calculation circuit 3. The trigger circuit 5 actuates a protective device such as an air bag 6.

The calculation circuit 3 will be described first.

In a block 101 which is a first calculation means, magnitude of physical quantities in a first wave formed with crash deceleration are calculated. This calculation starts when a deceleration signal is developed initially from the accelerometer 1. In a block 102 which is a second calculation means, a first value is calculated on the basis of the acceleration signal from the accelerometer. The first value corresponds to a magnitude of deceleration such as a speed value V or a time integrated value $\int Vdt$ obtained by integrating the speed V with respect to time. In a block 104 which is a comparator means, the first value is compared with a threshold value. In a block 103 which is an adjusting means, the first value and/or the threshold value is adjusted on the basis of the magnitude of physical quantities.

That is, when the magnitude of the physical quantities in the first wave is large, the first value corresponding to the magnitude of deceleration is made larger or, alternatively, the threshold value is made small. Accordingly, when the first value is adjusted by the adjusting means 103 the first value resulting from this adjustment is compared with the threshold value in a comparator means 104. When the threshold value alone is adjusted, the untouched first value is compared with the threshold value resulting from the adjustment. After the aforesaid comparison, a trigger signal is outputted when the first value exceeds the threshold value. The trigger circuit 5 actuates the airbag 6 with the trigger signal. Such an above adjustment enables a judgment on the necessity of an actuation to be improved.

Figure 2:
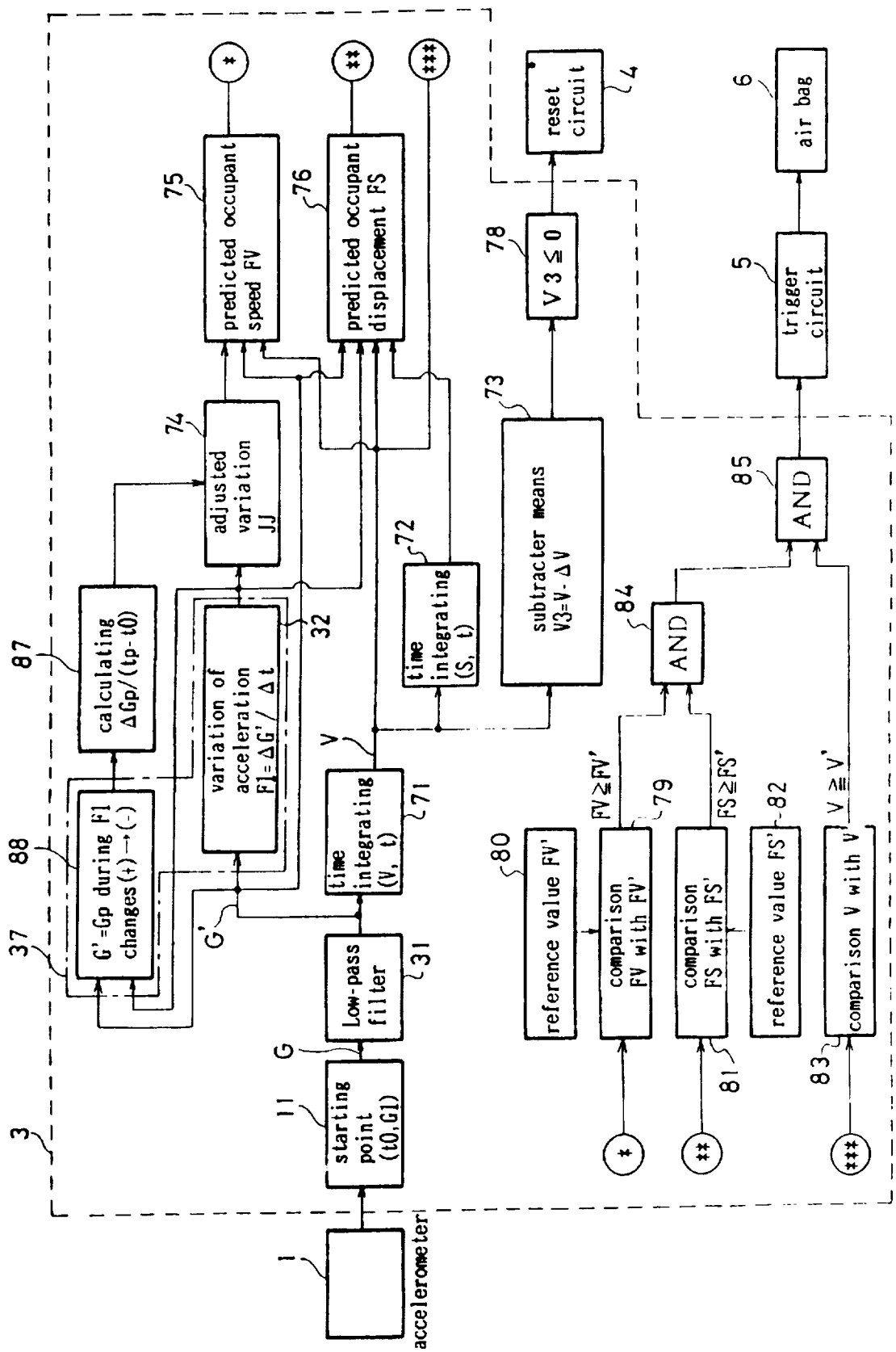
FIG. 2 is a block diagram to help explain the construction of one embodiment of the invention.

There shall now be described the first embodiment of the invention in connection with FIGS. 2 to 6. As shown in FIG. 2, the accelerometer 1 is connected to a reset circuit 4 and the trigger circuit 5 through the calculation circuit 3. The trigger circuit 5 actuates a protective device such as the airbag 6.

Specific reference is now made to the calculation circuit 3. In a block 11, a time t0 is determined, at which the acceleration G measured by the accelerometer 1 exceeds a prescribed acceleration G1. In a block 31, the acceleration G is allowed to pass through a low-pass filter. The low-pass filter is subject to take away noise whereby waveform of acceleration is improved so as to be more sharply defined. The characteristics of low-pass filters should be fitted to the specifications for individual crash sensors.

In a block 32, a first variation F1 of an acceleration signal G' is calculated per unit time. The acceleration signal G' is what has passed through the low-pass filter 31. This first variation F1 is calculated from $F1=\Delta G'/\Delta t$.

In a block 88, a first wave Gp is output. The first wave Gp is defined by such acceleration signals G' as measured during times when a value of the first variation F1 changes from a positive value to a negative value and then becomes zero again in an initial stage of a crash. Thus the block 32 and the block 88 constitute a means 37 for extracting the first wave Gp from the acceleration signal G'.

In a block 87, a second variation ΔGp of the acceleration signal from the time t0 to a time tp in the first wave Gp is calculated. The time tp is a time point when a peak acceleration appears. This second variation ΔGp is given by ΔGp/(tp−t0). The block 87 for calculating this second variation ΔGp constitutes a means for calculating a physical quantity in the first wave. In a block 74, the first variation F1 taken from the block 32 is adjusted on the basis of the second variation ΔGp, as a result of that, an adjusted variation JJ is made. Thus the blocks 37, 87 and 74 constitute a first calculation means for calculating the magnitude of physical quantity in the first wave Gp.

While, in a block 71 which is a time integrating means, the acceleration signal G' taken from the low-pass filter 31 is integrated with respect to time so that a speed V may be obtained.

In a block 72 which is further time integrating means, the speed V is integrated with respect to time so as to obtain a distance S. In a block 75 which is a second calculation means, the speed FV regarding an occupant at a prescribed advance time from the occurrence of the crash is predicted by applying the speed V, acceleration signal G' and adjusted variation JJ taken respectively from the blocks 71, 31 and means 74. In a block 76 which is a third calculation means, a displacement FS regarding the occupant at the prescribed advance time from the occurrence of the crash is predicted by applying the distance S, speed V, acceleration signal G' and first variation F1 taken from the blocks 72, 71, 31 and means 32 respectively.

In a block 79 which is a first comparator means for judging on a necessity of actuation, the occupant speed FV is compared with a preset reference value FV' (in a block 80) which is a first threshold value and then a first trigger signal is output when the occupant speed FV is greater than or equal to the reference value FV'.

In a block 81 which is a second comparator means for judging on a timing of actuation, the occupant displacement FS is compared with a preset reference value FS' (in a means 82) which is a second threshold value and then a second trigger signal is output when the occupant displacement FS is greater than or equal to the reference value FS'.

In a block 84 which is a first AND-circuit means, a third trigger signal is output when both the first and the second trigger signals are input into the first AND-circuit means 84. In the meantime, in a block 83 which is a third comparator means 83, the speed V taken from the block 71 is compared with a preset reference value V' and then a fourth trigger signal is output when the speed V is greater than or equal to the reference value V'. This third comparator means 83 judges whether the acceleration signal is a rough road pulse or not.

In a block 85 which is a second AND-circuit means, a fifth trigger signal is output to the trigger circuit 5 only when both the third and the fourth trigger signals are input into the second AND-circuit means 85. On receipt of the fifth trigger signal, the trigger circuit 5 actuates the air bag 6.

In a block 73 which is a subtracter means 73, a prescribed value $\Delta V$ is subtracted from the speed V taken from the block 71 so as to make a subtracted value V3=V−$\Delta V$. In a block 78, the subtracted value V3 is judged whether its value V3 is less than zero or not and then a signal for resetting is output when the subtracted value V3 is less than zero.

In a block 4 which is a reset circuit 4, the results of the calculations are reset on receipt of the reset signal taken from the block 78.

Figure 3:
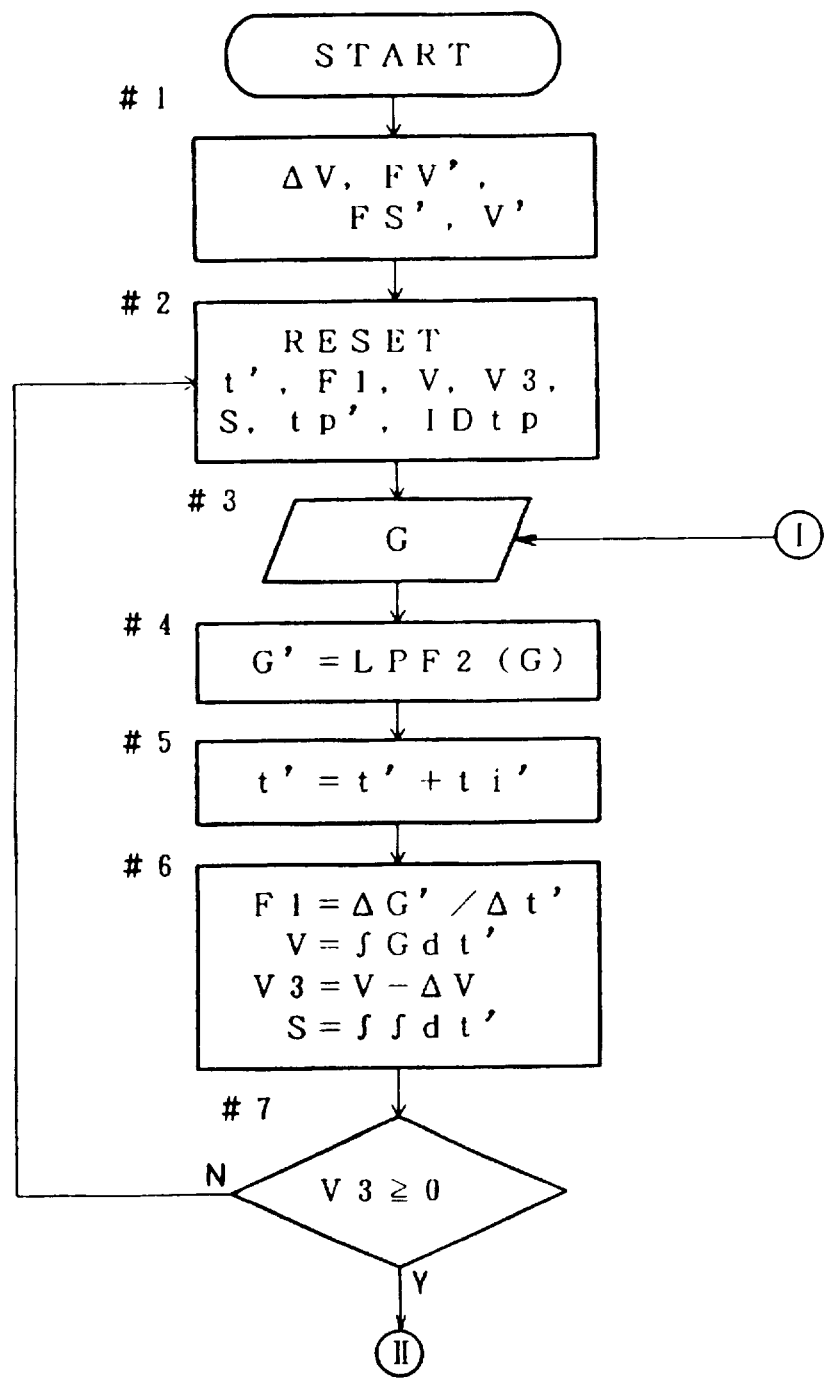
FIG. 3 is one portion of a flow diagram representing successive steps in a typical operation thereof.
Figure 4:
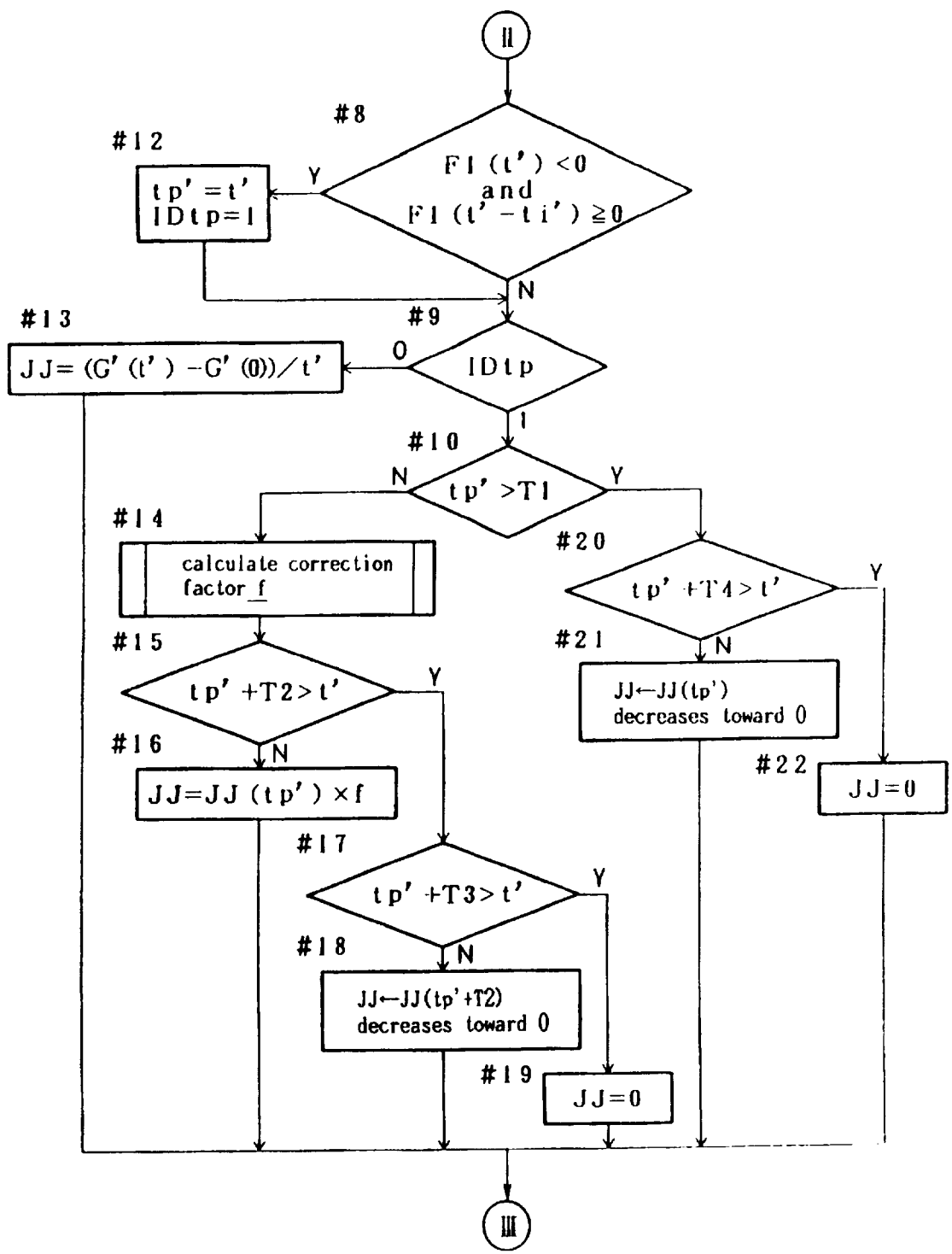
FIG. 4 is another portion of the flow diagram.
Figure 5:
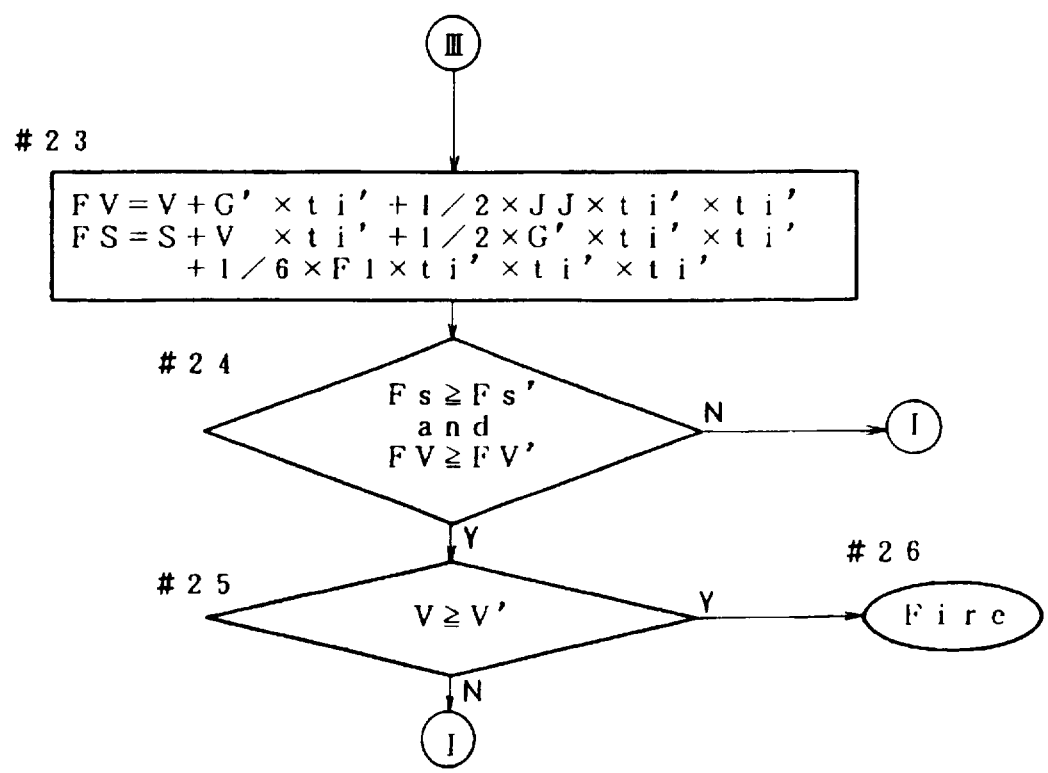
FIG. 5 is a third portion of the flow diagram.

Successive steps in a typical practice of arithmetic functions to be performed by the calculation circuit 3 will now be described with reference to such a flow chart as shown in FIG. 3 to 5.

At a step #1, a prescribed value $\Delta V$, reference values FV', FS' and V' are read when the arithmetic functions is started in FIG. 3. These values are tuning parameters. Such tuning parameters are almost common to a same maker and a same type of a vehicle except the reference values FV', FS' and V'. At a step #2, a time t', a first variation F1, a speed V, a distance S, a subtracted value V3, a time tp and a flag IDtp are reset, which are variable value. At a step #3, an acceleration G is read. At a step #4, the acceleration signal G' passed through the low-pass filter is calculated. At a step #5, the time t' which elapses after the start of integral is calculated from t'=t'+ti'. The ti' is a sampling interval, accordingly, corresponds to t in FIG. 2.

At a step #6, the first variation F1, the speed V, the subtracted value V3 and the distance S are calculated respectively from F1=G'/$\Delta t$', V=$\int$ Gdt', V3=V−$\Delta V$ and S=$\iint$ Gdt'.

At a step #7, the subtracted value V3 is judged whether its value V3 is greater than or equal to zero or not. When the subtracted value V3 is found to be less than zero, the processing returns to the step #2 and the results of arithmetic operations hitherto performed are reset.

At the step #7, when the value V3 is found to be greater than or equal to zero, the processing proceeds to a step #8 in FIG. 4. At the step #8, the first variation F1 is judged whether its variation F1 changes the positive value to negative or not from F1(t'−t i')≧0 and F1(t')<0. That is, the first wave is judged whether its wave is detected or not from existence of a peak acceleration in an intial stage of a crash. When the first wave is detected, the processing proceeds to a step #12.

At a step #12, a peak time of the first wave is defined by the time t' and the flag IDtp is defined by 1. At a step #9, the flag IDtp is judged whether its flag IDtp is 1 or not. When the flag IDtp is 0, the adjusted variation JJ is defined by JJ=(G'(t')−G'(0))/t' at a step #13. This means that the magnitude of deceleration is not adjusted for the purpose of overestimating the crash.

When the flag IDtp is 1, i.e., when the first wave is detected, the peak time tp is judged whether its time tp is greater than or equal to a first prescribed time T1 or not at a step #10. This means that the first wave is judged whether its wave generates drastically or not. When the peak time tp is less than the first prescribed value T1, i.e., the first wave generates drastically, the processing proceeds to a step #14. At the step #14, a correction factor f is calculated in such a manner as follows. The more drastically the first wave generates and the higher the peak value of the first wave is , the greater the value of correction factor f is. At a step #15, a present time t' is determined and then judged whether its time t' is before a lapse of a second prescribed time T2 from the peak time tp or not. At a step #16, the adjusted variation JJ is defined by JJ=JJ(tp')×f when the present time t' is before a lapse of a second prescribed time T2 from the peak time tp, where JJ(tp')=(G'(tp')−G'(O))/tp'. Thus, the adjusted variation JJ is overestimated by the multiplying the correction factor f.

The processing proceeds to step #17 when the present time t' after a lapse of a second prescribed time T2 from the peak time tp. At a step #17, a present time t' is judged whether its time t' is before a lapse of a third prescribed time T3 from the peak time tp or not. At a step #18, the adjusted variation JJ is defined by such a value as gradually decreases from JJ (tp'+T2) toward zero when the present time t' is before a lapse of the third prescribed time T3 (where T3>T2) from the peak time tp, where JJ (tp'+T2) is a value assumed by the adjusted variation JJ at the lapse of the second prescribed time T2. At a step #19, the adjusted variation JJ is defined by zero when the present time t' is after a lapse of the third prescribed time T3 from the peak time tp.

While, when the peak time tp is greater than the first prescribed time T1 at the step #10, i.e., the first wave generates gently, the processing proceeds to a step #20. At the step #20, a present time t' is determined and then judged whether its time t' is before a lapse of a forth prescribed time T4 from the peak time tp or not. At a step #21, the adjusted variation JJ is defined by such a value as gradually decreases from JJ (tp') toward zero when the present time t' is before the lapse of a fourth prescribed time T4 from the peak time tp. At a step #22, the adjusted variation JJ is defined by zero when the present time t' is after the lapse of the fourth prescribed time T4 from the peak time tp.

Next, the processing proceeds to step 23 in FIG. 5, in which the occupant speed FV and the occupant displacement FS at the prescribed advance time from the occurrence of the crash are predicted respectively from as follows.

$$FV = V + G \times t' + 1/2 \times JJ \times t' \times t'$$
$$FS = S + V \times t' + 1/2 \times G \times t' \times t' + 1/6 \times F1 \times t' \times t' \times t'$$

Although it is not shown in FIG. 2 and the flow charts, the displacement FS can also be adjusted with the aid of the adjusted variation JJ (which corresponds to the magnitude of physical quantity in the first wave). This is an action for the purpose of coping with a phase lag occurring in a circuit, which does not form any part of the invention at all. It furnishes, however, an effective way of correcting the phase lag.

At a step #24, the occupant speed FV and the occupant displacement FS are compared respectively with the reference values FV' and FS'. When either the occupant speed FV or the occupant displacement FS is less than each reference value FV' or FS', the processing returns to the step #3 in FIG. 3. On the other hand, the processing proceeds to a step #25 when both of the occupant speed FV and the occupant displacement FS are greater than or equal to the reference values FV' and FS'. At the step #25, the speed V is compared with the reference value V'. When the speed V is less than the reference value V', the processing returns to the step #3 in FIG. 3. On the other hand, at the step #26, a trigger signal is output when the speed V is greater than or equal to the reference value V'.

Figure 6:
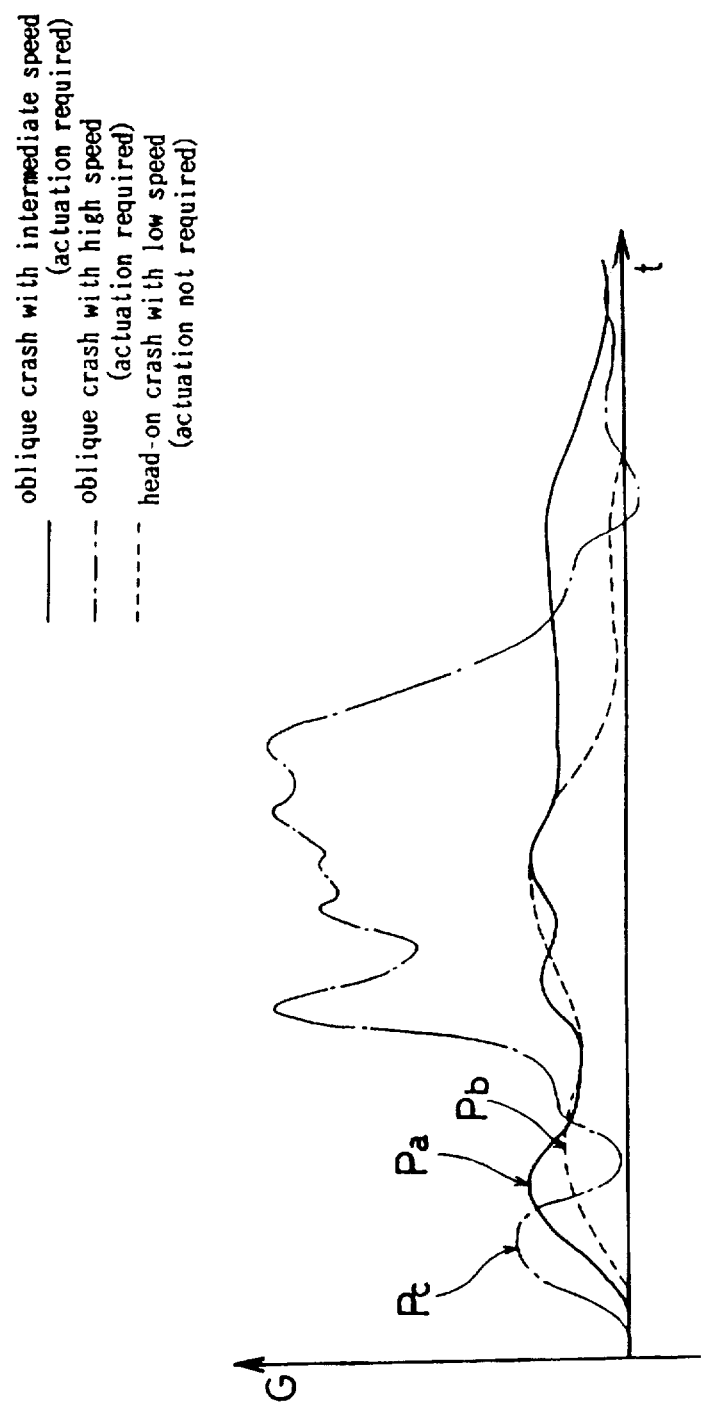
FIG. 6 is a waveform chart, illustrating the waveforms of signals developed during crashes.
Figure 13:
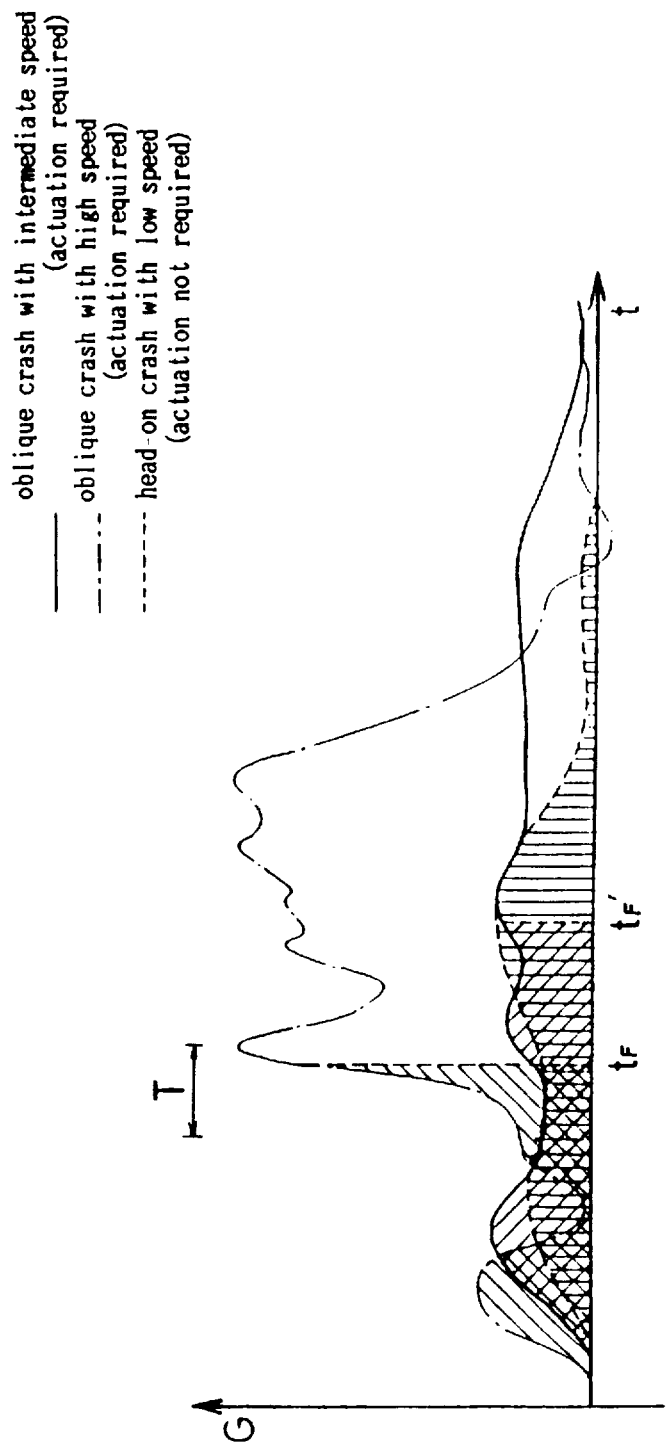
FIG. 13 is another waveform chart illustrating waveforms of signals developed during crashes.

Referring to FIG. 6, exemplary waveforms are shown to illustrate how a crash sensor incorporating the above-described embodiment of the invention works. These waveforms are substantially similar to those shown in FIG. 13. The solid and dot-dash curves represent how the acceleration varies with time under the condition that oblique crashes occur with intermediate and high speeds respectively. The dotted curve represents how the acceleration varies with time under the condition that a head-on crash occurs with low speed. The first wave Pa and Pc in the oblique crashes with intermediate and high speeds respectively are sharply defined, while the first wave Pb in the head-on crash with low speed is not sharply defined. The slope lines of first waves Pa and Pc in oblique crashes with intermediate speed and high speed respectively are steeper from generation points as compared with one in a head-on crash with low speed. As aforesaid, the higher the peak acceleration is and the steeper the slope line of the first wave is, the more greatly the occupant speed FV at the prescribed advance time from the occurrence of the crash is overestimate. Thus, according to the present invention, a sharper distinction between the oblique crash with intermediate or high speed and the head-on crash with low speed will be made in an initial stage of the crash. Both oblique crashes with intermediate speed and high speed requires the actuation of protective devices, on the other hand, the head-on crash with low speed does not require the actuation of protective devices. Accordingly, when the present invention incorporated in the protection such a system as the predicted occupant displacement and the predicted occupant speed are applied for the purpose of protecting occupant from the damage of a crash, the present invention can judge certainly on the necessity of actuating protective devices in the initial stage of the crash.

Further, when the acceleration signals include a rough road pulse as a result of a vehicle running over a rough road, the third comparator means 83 shown in FIG. 2 judges whether the acceleration signal is a rough road pulse or not from a character of what rough road pulse is subject to only vibration no relative to variation of an acceleration signal, and then does not output a trigger signal when the acceleration signal is a rough road pulse, whereby a malfunction caused from the rough road pulses is prevented.

In aforesaid embodiment, the magnitude of physical quantity obtained in the first wave is used for adjusting the occupant speed FV at the prescribed advance time from the occurrence of the crash so as to overestimate the crash. In another embodiment, the magnitude of physical quantity obtained in the first wave may be used for adjusting the occupant displacement FS at the prescribed advance time from the occurrence of a crash. In this case, an overestimation of the crash by adjusting the occupant displacement FS allows a timing of an actuation to be advanced. An underestimation of the crash by adjusting the occupant displacement FS allows a timing of an actuation to lag. As aforesaid, a phase lag occurring in a circuit can also be corrected with the aid of the magnitude of physical quantity obtained in the first wave.

Figure 7:
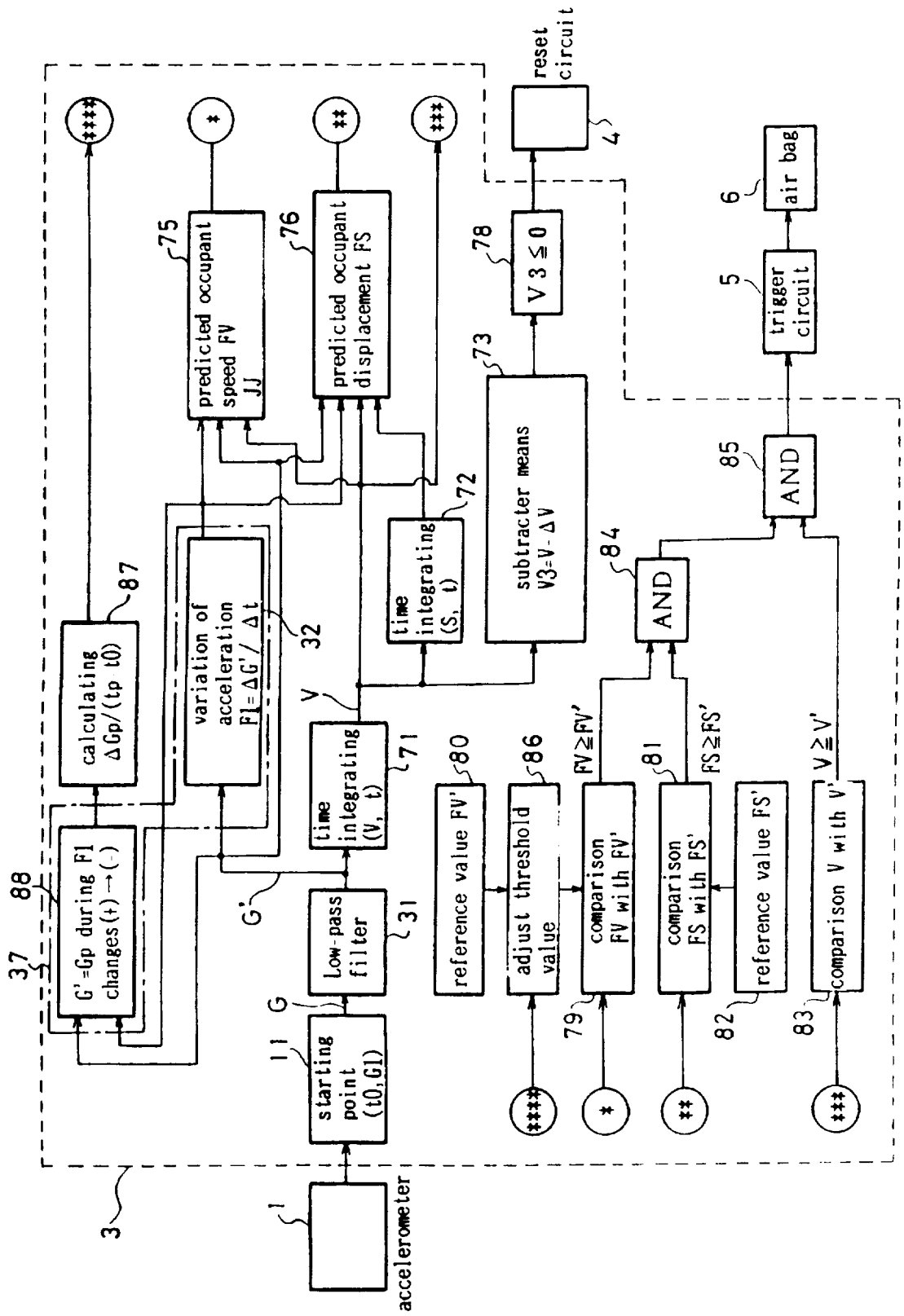
FIG. 7 is a block diagram to help explain the construction of another embodiment of the invention.

Another embodiment of the invention is illustrated in FIG. 7. This embodiment differs from that of FIG. 2 by two facts as follows. The first fact is that there is no block 74 which adjusts the first variation F1 taken from the block 32, accordingly, the first variation F1 is directly fed to the second calculation means 75. The second fact is that there is a block 86 which is a means for adjusting the first threshold value. The second variation $\Delta Gp/(tp-t0)$ from the block 87 is fed to the block 86 and the reference value FV' is fed to the block 79 through the block 86, where the block 79 is a first comparator means for judging on the necessity of actuation.

The means 86 adjusts the first threshold value in such a manner that the greater the second variation $\Delta Gp/(tp-t0)$ is, the smaller the reference value FV' is made. Consequently, the more drastically the first wave generates and the higher the peak acceleration in the first wave is, the easier the occupant speed FV at the prescribed advance time from the occurrence of the crash exceeds the adjusted reference value FV'. Result of that, the occupant speed FV is overestimated. This brings the same effect as the crash sensor in connection with FIG. 2 brings.

Figure 8:
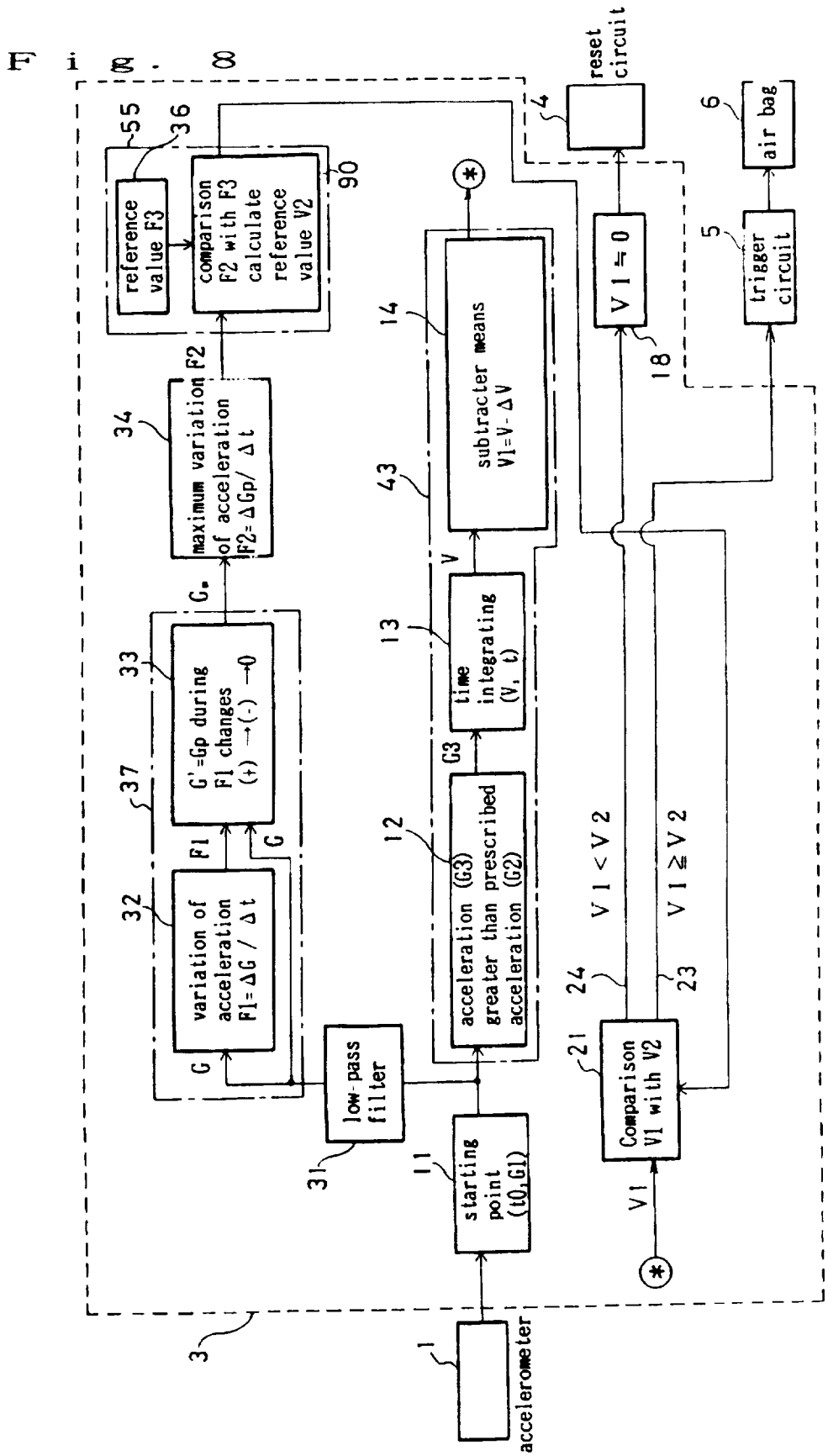
FIG. 8 is a block diagram to help explain the construction of a third embodiment.

The third embodiment of the invention is illustrated in FIG. 8, in which the accelerometer 1 is connected to the reset circuit 4 and the trigger circuit 5 through the calculation circuit 3. The trigger circuit 5 actuates a protective device such as the air bag 6.

Specific reference is now made to the calculation circuit 3. In a block 11, a time t0 is determined, at which an acceleration G measured by the accelerometer 1 exceeds a prescribed acceleration G1. In a block 31, the acceleration G is allowed to pass through a low-pass filter. The low-pass filter is subject to take away not only noise but also a rough road pulse whereby waveform of accelerations is improved so as to be more sharply defined. The characteristics of low-pass filters should be fitted to the specifications for individual crash sensors. In a block 32, a first variation F1 of an acceleration signal is calculated per unit time from F1=$\Delta G/\Delta t$. In a block 33, a first wave Gp is outputted. The first wave Gp is defined by such acceleration signals G as measured during times when the value of the first variation F1 changes from positive value to negative value and then becomes zero again in an initial stage of the crash. Thus the block 32 and the block 33 constitute a means 37 for extracting the first wave Gp from the acceleration signal G. In a block 34, a maximum variation F2 of an acceleration signal in the first wave is calculated from $\Delta Gp/\Delta t$. The means 34 for calculating this maximum variation F2 constitutes a means for calculating a physical quantity in the first wave. Thus the blocks 37 and calculation means 34 constitute a first calculation means for calculating the magnitude of physical quantity in the first wave Gp.

In a block 90, the maximum variation F2 is compared with a reference value F3 presented from a block 36 and a reference value V2 to be fed to a block 21 is calculated. The block 21 will appear hereinafter. Such the prescribed reference value V2 as varies normaly with time is output from the block 90. When the maximum variation F2 is greater than or equal to the reference value V3, such the prescribed reference value V2 as is smaller than normal prescribed value is output from the block 90. The block 36 and block 90 constitutes a means for adjusting means 55.

While in a block 12 which is peak cutting means, acceleration G3 is calculated from the measured acceleration G. The acceleration G3 is equal to or greater than a prescribed acceleration G2. That is, such measured acceleration G as is smaller than the prescribed acceleration G2 is defined by zero so as to cut them from the measured accelerations G.

In a block 13 which is a time integrating means 13, the acceleration G3 calculated in the block 12 begins to be integrated with respect to time. The time integral value as a result is designated as V.

In a block 14 which is a subtraction means, a value of a prescribed function is subtracted from the time integral value V taken from the block 13. In this case, the value of the prescribed function is constant value ΔV and this constant value ΔV is subtracted per unit time from the time integral value V. The subtracted integral value as a result is designated as V1. In FIG. 8, the blocks 12 to 14 constitute a second calculating means 43 for calculating a value corresponding to the magnitude of deceleration.

In a block 21 which is a comparator means, the subtracted integral value V1 is compared with the reference value V2 taken from the block 90. When the subtracted integral value V1 is greater than or equal to the reference value V2, a third trigger signal is fed to the trigger circuit 5 through a line 23. On the other hand, when the subtracted integral value V1 is less than the reference value V2 and it is detected in a block 18 through a line 24 that the subtracted integral value V1 is approximately zero (negative or a slight positive value), a reset signal is developed from the block 18 to the reset circuit 4. And in the reset circuit 4, operation of time integration is stopped and the subtracted integral value V1 and time t are reset.

Figure 9:
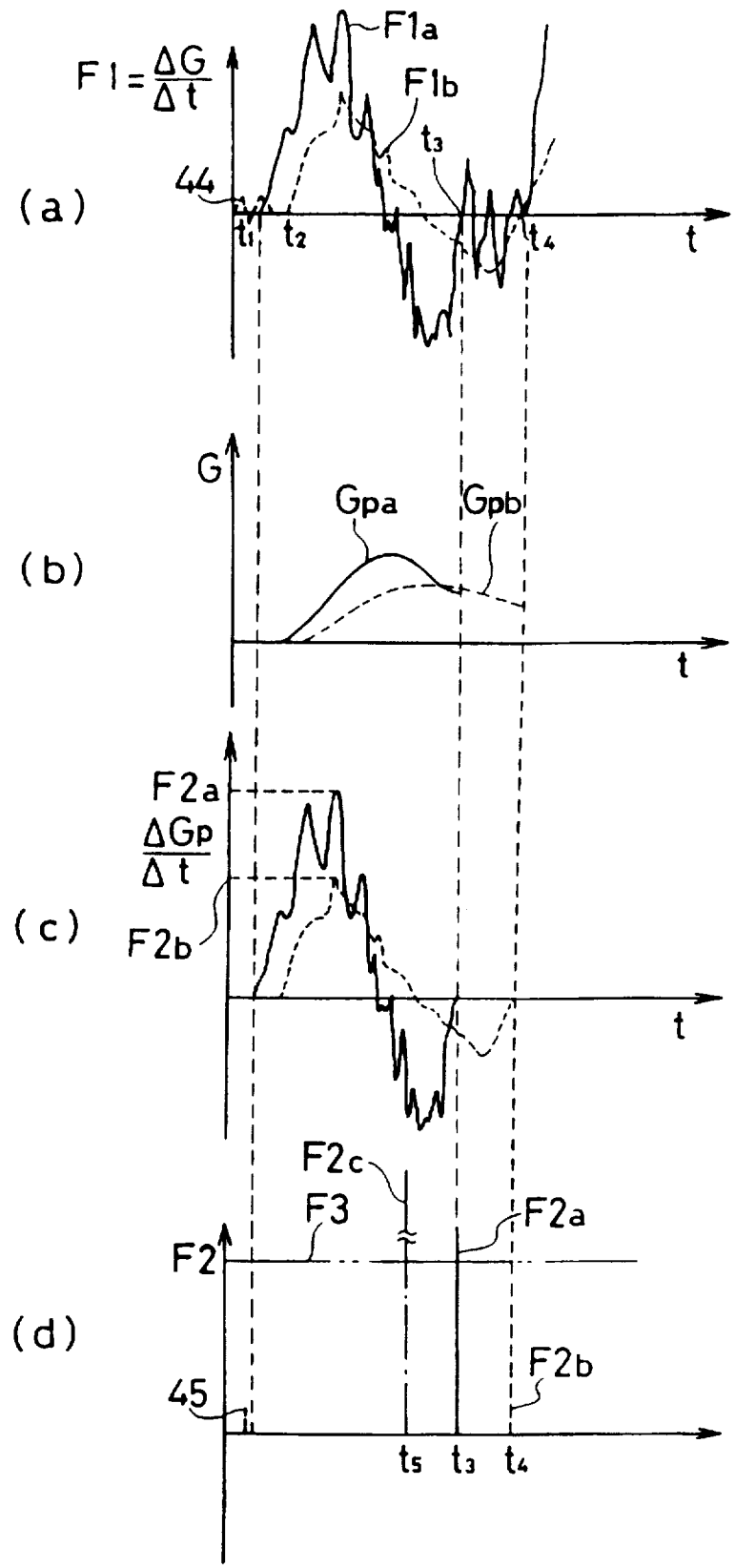
FIG. 9 is a graphical representation useful in understanding arithmetic operations to be performed therein.

Functions of the blocks 31–34, 36, 90 will be described referring to FIGS. 6 and 9. Acceleration waves of an oblique crash with intermediate speed and a head-on crash with low speed-have such first waves as shown in FIG. 6 with a solid curve and a dotted curve respectively. Now, let it be supposed that two acceleration signals of an oblique crash with intermediate speed and a head-on crash with low speed respectively having the above mentioned acceleration waves are input.

At first, the first variation F1 of each acceleration signals is calculated from F1=ΔG/Δt as shown in FIG. 9(a). The first variations F1 of an oblique crash with intermediate speed and a head-on crash with low speed are represented by curves F1a, F1b respectively, which change from positive value to negative value and then becomes positive value again respectively.

The times when they begin to show initially positive values are measured as times t1 and t2 respectively. Further, the times when they become zero after changing from positive values to negative values are measured as times t3 and t4 respectively. Each of the acceleration waveforms from time t1,t2 to t3,t4 are output as a first wave Gpa, Gpb as shown in FIG. 9(b). Next, maximum variations F2a, F2b of accelerations in the first waves Gpa,Gpb are calculated respectively from ΔGp /Δt as shown in FIG. 9(c). The maximum variations F2a, F2b are compared with the reference value F3 respectively in FIG. 9(d). In case of the oblique crash with intermediate speed, the maximum variation F2a is greater than the reference value F3. Therefore, the smaller reference value V2 than normal state is output. On the other hand, in case of the head-on crash with low speed, the maximum variation F2b is less than the reference value F3. Therefore, the smaller reference value V2 than normal state is not output.

Further, in case of an oblique crash with high speed, the slope line Pc of the first wave at the initial stage is steeper as shown in FIG. 6. Therefore, a maximum variation F2c of accelerations in the first waves is much greater than the maximum variation F2a and the reference value V2 is output at a time t5 before the time t3. The time t3 is, of course, a time when the reference value V2 is output in case of the oblique crash with intermediate speed. In case of an oblique crash with high speed, the maximum variation F2c is also greater than the reference value F3. Therefore, the smaller reference value V2 than normal state is output.

Figure 14:
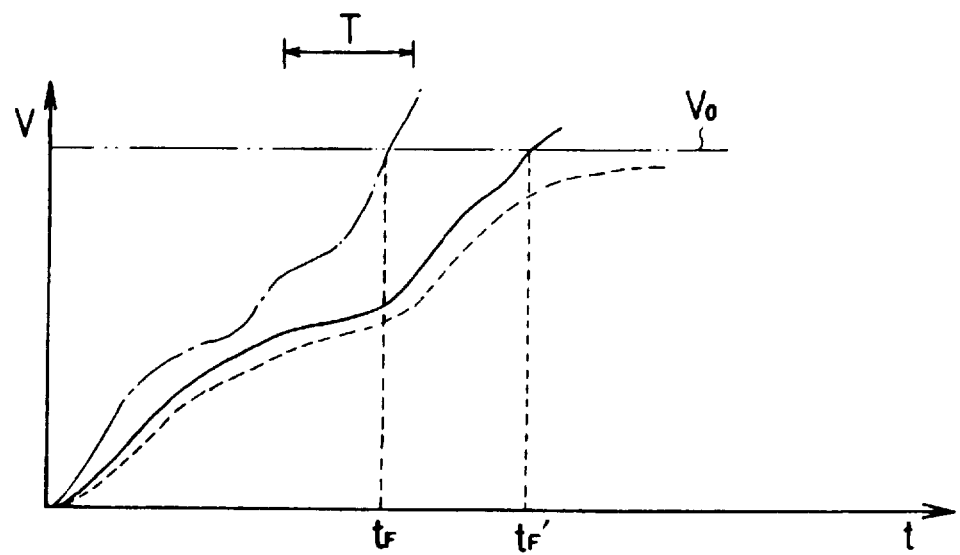
FIG. 14 is a graph illustrating examples of whether or not a protective device is actuated.

As shown in FIG. 9(d), the maximum variation F2a in case of the oblique crash with intermediate speed, not to speak of the maximum variation F2c in case of the oblique crash with high speed, makes a sharp distinction against the maximum variation F2b in case of the head-on crash with low speed. Consequently, the present invention can surely distinguish between the oblique crash with intermediate speed and the head-on crash with low speed as compared with the prior art crash sensor shown in FIG. 14. Further, there are the time points t3–t5 for judging on the necessity of the actuating the air bag in initial stages of the crashes respectively, therefore the actuation of the air bag is prevented from the delay. In case that acceleration signals are rough road pulses, a variation 44 and a maximum variation 45 of acceleration signals are smaller than ones in case of the oblique crash with intermediate speed as shown in FIG. 9(a) and FIG. 9(d) respectively because the rough road pulses are decrease by the aforesaid low-pass filter. Accordingly, the present invention can surely distinguish between the rough road pulses and the acceleration signals of the oblique crash with intermediate speed so that the air bag may not be actuated by the rough road pulses.

Next, functions in blocks 11–14 and 21 will be described referring to FIG. 10. As shown in FIG. 10(a), arithmetic operations begin to be performed at the time t0 when the acceleration G is exceeded a prescribed acceleration G1. Accelerations which are less than the prescribed acceleration G2 are regarded as zero and accelerations which are greater than or equal to the prescribed acceleration G2 are integrated with respect to time. This means that peak portions of the accelerations are cut from said accelerations G. The prescribed value ΔV is subtracted from the time integrated values per unit time.

By virtue of the above described arithmetic operations, an area provided with vertical lines in FIG. 10(b) are integrated portions and represents the subtracted integral value V1, wherein an area A is included in the subtracted integral value V1 as negative values while an area B is discarded. The prescribed acceleration G2 assumes a positive value and may be equal to the prescribed acceleration G1. The integration operation can be automatically started and reset by the reset circuit 4.

Figure 11:
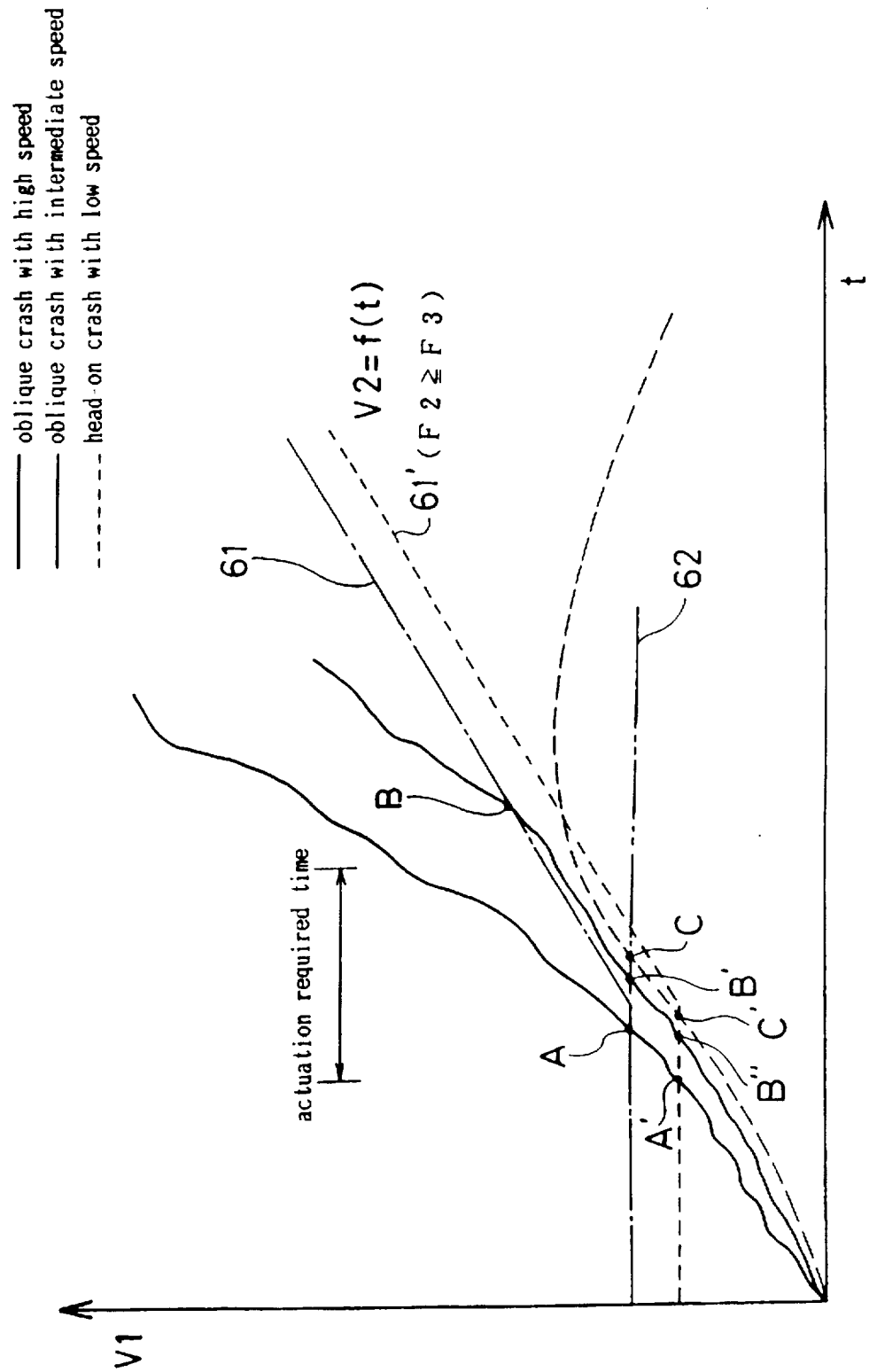
FIG. 11 is a graphical representation useful in understanding how values obtained by integrating acceleration signals with respect to time vary with time in the embodiment shown in FIG. 8.

Next, operations of the block 21 and the block 90 will be explained referring to FIGS. 8 and 11. In FIG. 11, the reference values V2 taken from the block 90 are one of the subtracted integral values V1 varying with time, and they are included in a prescribed time function as indicated with a dot-dash curve 61 in FIG. 11. When the subtracted integral value V1 is greater than or equal to the reference value V2, the comparator means 21 transmits a trigger signal to the trigger circuit 5.

In FIG. 11, such the reference value V2 taken from the block 90 as indicated with the dot-dash curve 61 is output when the physical quantity F2 in the first wave is less than the reference value F3 (F2<F3). The cross point, where each curve indicating each type of crashes crosses with the dot-dash curve 61, signifies the actuation point. Accordingly, the dot-dash curve 61 is not designated so as to cross the dotted curve which indicates the head-on crash with low speed because the head-on crash with low speed does not require the actuation of the air bag. Further, the dot-dash curve 61 is designated so as to cross with the thick and thin solid curves which indicate the oblique crash with high and intermediate speed respectively. The reference value V2 is designed as the above for the purpose of judging whether an occurring crash is the oblique crash with intermediate speed or not in the block 90 although the cross point A with the thick curve which signifies an actuation point A of the oblique crash with high speed is in the actuation required time while the cross point B with the thin curve which signifies an actuation point B of the oblique crash with intermediate speed is delayed outwards the actuation required time.

In the block 90 shown in FIG. 8, such the reference value V2 as indicated with the dot-dash curve 61' shown in FIG. 11 and less than the dot-dash curve 61 shown in FIG. 11 is output when the physical quantity F2 in the first wave is greater or equal to the reference value F3 (F2≧F3). In FIG. 11, the dot-dash curve 61' is designated so as to cross with the thick and thin solid curves which indicate the oblique crash with high and intermediate speed respectively. In this time, both the cross point A' with the thick curve which signifies an actuation point A' of the oblique crash with high speed and the cross point B" with the thin curve which signifies an actuation point B" of the oblique crash with intermediate speed are in the actuation required time.

In this point, it is not necessary to consider an actuation point C' of the head-on crash with low speed in FIG. 11 because a judging whether an occurring crash is the head-on crash with low speed or not is also done in the block 90 and such the reference value V2 as indicated with the dot-dash curve 61' is not output when the occurring crash is the head-on crash with low speed. Instead of the dot-dash curve 61' entirely less than the dot-dash curve 61, such the reference value V2 as indicated with the two-dot chain curve 62 is allowable. The two-dot chain curve 62 is designed so as to be less than the dot-dash curve 61 only in the late half stage of a crash.

Accordingly, when a "crash" is not determined in the block 90, a necessity of actuating such as an air bag is judged with the prior reference value V2 as indicated with the dot-dash curve 61. When a "crash" is determined in the block 90, a necessity of actuating such as an air bag is judged with the reference value V2 as indicated with the dot-dash curve 61' or two-dot chain curve 62 both of which are less than the dot-dash curve 61. And then a trigger signal is transmitted to the trigger circuit so as to actuate the air bag. Consequently, a sharp distinction can be made between an oblique crash with intermediate speed and a head-on crash with low speed.

In case that a necessity of actuating such as an air bag is judged from only operation of the second calculation means 43 and the comparator means 21, the judgment is passed through after a change of the speed in the crash has come up to a sufficient degree, so that reliability of the judgment for various types of crashes is obtained, on the other hand, a time point of the judgment is apt to delay. Therefore, reliability is more improved by combining the aforesaid two blocks 43, 21 with the block 90 which is capable of judging in the initial stage of a crash.

In this embodiment, the reference value V2 is adjusted only when the adjusting means 55 which is constituted of the blocks 90, 36 determines a "crash". As an alternative arrangement to the above, the reference value V2 may be adjusted correlatively to the maximum variation F2. Thus the adjustment may be made in such a manner that the greater the maximum variation F2 is, the smaller the reference value V2 is. Further, instead of adjusting the reference value V2 correlatively to the maximum variation F2 in the adjusting means 55, the subtracted integral value V1 may be overestimated. More further, both the subtracted integral value V1 and the reference value V2 may be adjusted, however, it is simpler to adjust either of the two.

Figure 12:
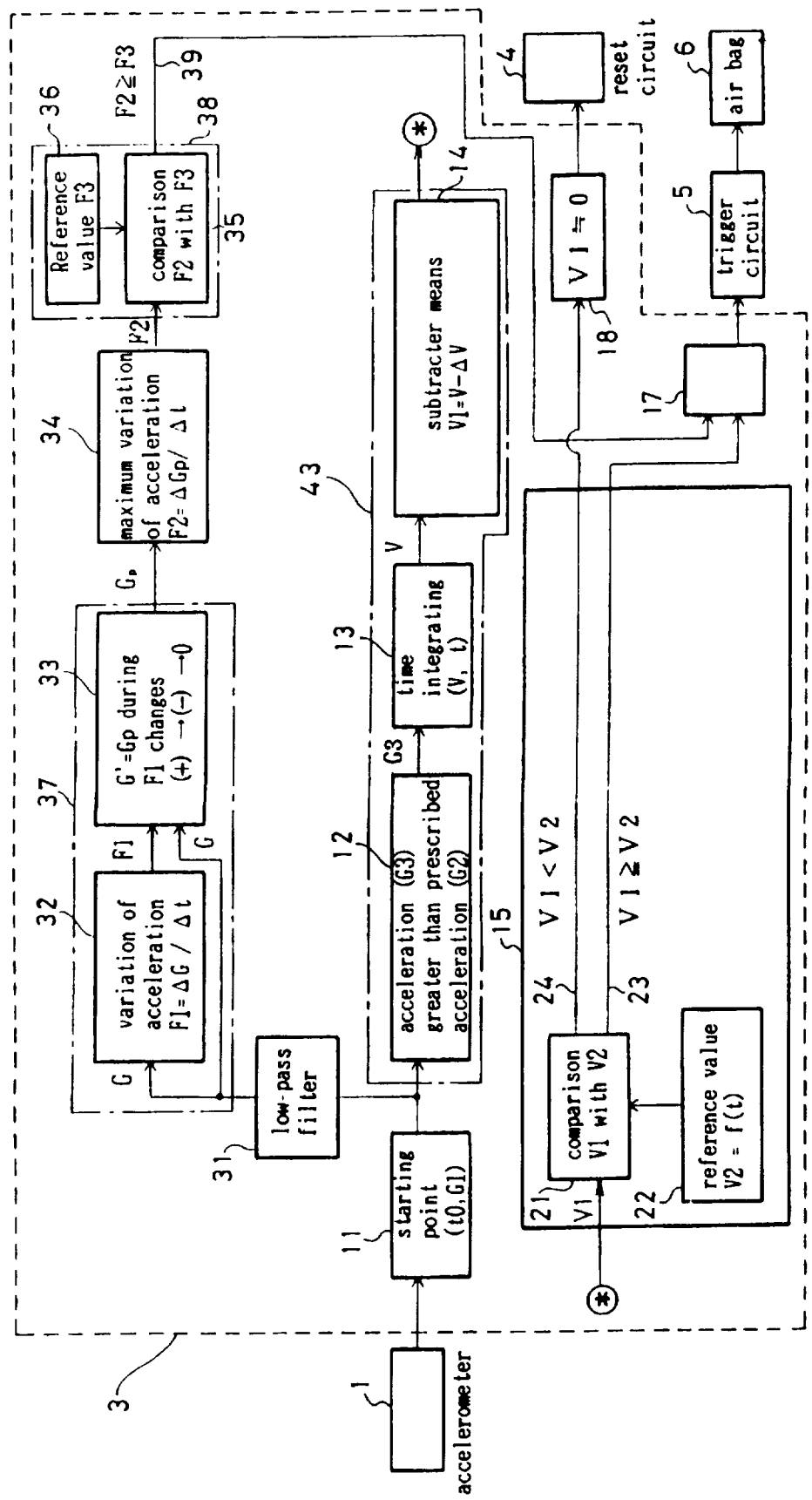
FIG. 12 is a block diagram to help explain the construction of a fourth embodiment.

The fourth embodiment of the invention is illustrated in FIGS. 11 and 12. In this embodiment, the physical quantity in the first wave is used independently for a judgment on necessity of the actuating the protective device. In this fourth embodiment, the same parts as ones in the third embodiments will need no further description since they have already been described, so the different parts from the third embodiments will be-described.

At first, construction of this fourth embodiment will be described Referring to FIG. 12, wherein this embodiment differs from that of FIG. 8 by the facts as follows. A block 38 plays a role as a first judging means 38 for judging a "crash" and then outputting a trigger signal by itself, which receives the maximum variation F2 from the block 34. While a block 15 plays a role as a second judging means 15 for judging a "crash" and then outputting a trigger signal by itself, which receives the subtracted integral value V1 from the block 43 playing a role as the second calculation means. A connecting circuit 17 for outputting a trigger signal to the trigger circuit 5 is connected to both the first and second judging means 38 and 15 with lines 39 and 23 respectively.

In the block 35 of which the first judging means 38 is constituted, the maximum variation F2 is compared with the prescribed reference value F3. When the maximum variation F2 is greater than or equal to the reference value F3, a first trigger signal transmitted to the connecting circuit 17 through a line 39.

In the block 21 of which the second judging means 15 is constituted, the subtracted integral value V1 is compared with the prescribed reference value V2 (taken from a block 22). When the subtracted integral value V1 is greater than or equal to the reference value V2, a second trigger signal is transmitted to the connecting circuit 17 through a line 23.

Such circuit as an OR circuit, AND circuit or weighting function circuit is applicable to the connecting circuit 17. In the case that the OR circuit is applied in the connecting circuit 17, the connecting circuit 17 outputs a third trigger signal to the trigger circuit 5 on receipt of either the first or the second trigger signal. In the case that the AND circuit is applied in the connecting circuit 17, the connecting circuit 17 outputs a third trigger signal to the trigger circuit 5 or receipt of both the first and second trigger signals. In the case that the weighting function circuit is applied in the connecting circuit 17, the connecting circuit 17 estimates the first and second trigger signals after giving prescribed weights to them respectively, and then outputs third trigger signal to the trigger circuit 5 on the basis of the estimation.

The operations of to the blocks 15 and 17 will be described in more detail referring to FIGS. 11 and 12. In FIG. 12, a reference value V2 is prescribed for the subtracted integral value V1 at the block 15. When the subtracted integral value V1 is greater than or equal to the prescribed reference value V2, the second trigger signal is transmitted to the connecting circuit 17. And in the connecting circuit 17, the third trigger signal is produced to be fed to the trigger circuit 5. In this time, conditions for producing the third trigger signal depends on what kind of circuit is applied in the connecting circuit 17 as described above.

In FIG. 11, the prescribed reference value V2 is designed so that the actuation point A of the oblique crash with high speed may fall within the required time, irrespectively the kind of the connecting circuit 17. Further, in the case of the OR circuit being applied in the connecting circuit 17, the prescribe reference value V2 is designed so as not to actuating air bag when the head-on crash occurs with low speed although an actuation point B of the oblique crash with intermediate speed is delayed outwards the actuation required time as shown in FIG. 11 with the dot-dash curve 61. The reference value V2 is designed as the above for the purpose of judging whether an occurring crash is the oblique crash with intermediate speed or not in the block 38. The effect obtainable from this arrangement is identical with that of the third embodiment.

Further, in case of the AND circuit being applied in the connecting circuit 17, the prescribed reference value V2 is designed so that the actuation point B' of the oblique crash with intermediate speed may fall within the required time although the actuation point C of the head-on crash with low speed may also fall within the required time as shown in FIG. 11 with the two-dot chain 62. The reference value V2 is also designed as the above for the purpose of judging whether an occurring crash is the head-on crash with low speed or not in the block 38. According to the this arrangement, the necessity of actuation can be judged with only the first judging means 38, the adjusting the timing of actuation is only done with the second judging means 15. Such a division of functions ensures the actuation of the protective device during a oblique crash with intermediate speed, and also enables the protective device always to actuate within the actuation required time irrespectively kinds of crash, and further improve the accuracy of timing of actuation.

In the case that the weighting function circuit is applied in the connecting circuit 17, the reference value V2 depends on the weights given to the the first and second trigger signals respectively. So the reference value V2 will be provided between the dot-dash curve 61 and the two-dot chain curve 62. The advantages obtainable from the first and second judging means 38 and 15 in case of the OR circuit applied in the connecting circuit 17 can be obtained in this case as well. Weight to be given to each advantage may be adjusted according to circumstances.

Next, a variation of the above embodiment will be described. A first wave Gp output from the means 33 in FIG. 8 may be defined by various ways, although, in the above embodiment, the first wave Gp is defined by such acceleration signals as measured during times when a value of the first variation F1 changes from positive value to negative value and then becomes zero again in an initial stage of a crash. For example, "the first wave Gp is defined by such acceleration signals as measured during times when a value of the first variation F1 changes from positive value to zero in an initial stage of a crash," or "the first wave Gp is defined by such acceleration signals as measured during times when a value of the first variation F1 changes from positive value to negative value in an initial stage of a crash." The time required for the arithmetic operations can be shortened by this alternative form of the means 33.

The means 34 serves the purpose of arithmetically finding the magnitude of physical quantity in the first wave. Various quantities can be applied as the physical quantities although only a maximum variation in the first wave of an acceleration signal is applied as the physical quantity in the above embodiment. For example, average acceleration, maximum acceleration, speed, energy, mean value of variations of acceleration, variation of acceleration at a moment when a peak acceleration occurs in the first wave, variation of acceleration until the aforesaid moment, time until the aforesaid moment, duration of the first wave, they are possible to use instead of using this maximum variation. In the case of using the variation of acceleration as the physical quantity, the physical quantity is free from an influence of accuracy of an accelerometer.

The second calculating means incorporated in the third and fourth embodiments and the second judging means incorporated in the fourth embodiment are well known in the art as conventional. They furnish an effective sequence of arithmetic operations when combined with the first calculating means and the first judging means which form a part of the invention. Instead of using this combination, however, it is also possible to use only the first calculation means and the first judging means as the present invention.

FIELD OF INDUSTRIAL UTILIZATION

The crash sensor in accordance with the present invention is designed for use in a protective device for the safety of a vehicle occupant, and is especially suited for actuating the protective device in the intial stage of a gentle crash such as an oblique crash with intermediate speed.

We claim:

1. A crash sensor, comprising:

an accelerometer for developing an acceleration signal;

calculation means for calculating a first value on a basis of said acceleration signal from said accelerometer, the first value corresponds to a magnitude of deceleration;

comparator means for comparing said first value with a threshold value and outputting a trigger signal when judging an occurrence of a crash from said first value exceeding said threshold value;

a trigger circuit for actuating a protective device on receipt of said trigger signal from said comparator means;

physical quantity calculation means for calculating a magnitude of physical quantities in a first wave, said first wave being defined by acceleration signals measured during times when a sign of a variation regarding said acceleration signals changes, and then becomes zero again in an initial stage of a crash, said measuring starts when said accelerometer initially develops a deceleration signal; and adjusting means for adjusting at least one of the following two parameters to be used in said comparator means in accordance with said magnitude of physical quantities in said first wave;

(a) said first value corresponding to the magnitude of deceleration and (b) said threshold value.

2. A crash sensor, comprising:

an accelerometer for developing an acceleration signal;

occupant speed calculation means for calculating a predictive speed regarding an occupant on a basis of said acceleration signal from said accelerometer;

occupant displacement calculation means for calculating a predictive displacement regarding an occupant on a basis of said acceleration signal from said accelerometer;

speed comparator means for comparing said predictive occupant speed with a first threshold value and outputting a first trigger signal when judging on a necessity of an actuation of a protective device from said predictive occupant speed exceeding said first threshold value;

displacement comparator means for comparing said predictive occupant displacement with a second threshold value and outputting a second trigger signal when judging on a timing of the actuation from said predictive occupant displacement exceeding said predicated occupant displacement said second threshold value;

AND-circuit means for outputting a third trigger signal on receipt of both said first and second trigger signals from said speed comparator means and said displacement comparator means, respectively;

a trigger circuit for actuating said protective device on receipt of said trigger signal from said AND-circuit means;

physical quantity calculation means for calculating a magnitude of physical quantities in a first wave, said first wave being defined by acceleration signals measured during times when a sign of a variation regarding said acceleration signals changes and then becomes zero again in an initial stage of a crash, said measuring starts when said accelerometer initially develops a deceleration signal; and adjusting means for adjusting at least one of the following four parameters to be used in one of said speed or said displacement comparator means in accordance with said magnitude of physical quantities in said first wave;

(a) said predictive occupant speed (b) said predictive occupant displacement (c) said first threshold value and (d) said second threshold value.

3. A crash sensor as defined in claim 2, wherein said adjusting means adjusts either said predictive occupant speed taken from said occupant speed calculation means or said first threshold value taken from said speed comparator means.

4. A crash sensor, comprising:

an accelerator for developing an acceleration signal;

peak cutting means for cutting a peak portion from said acceleration signal;

time integrating means for integrating said peak cut from said acceleration signal with respect to time;

subtraction means for subtracting a value from said time integrated value so as to obtain a subtracted integral value, said value is a result of integrating a prescribed function with respect to time;

comparator means for comparing said subtracted integral value with another value of another prescribed function varying with time and outputting a trigger signal when said subtracted integral value is equal to or greater than said another value;

a trigger circuit for actuating a protective device on receipt of said trigger signal from said comparator means;

physical quantity calculation means for calculating a magnitude of physical quantities in a first wave, said first wave being defined by acceleration signals measured during times when a sign of a variation regarding said acceleration signals changes and then becomes zero again in an initial stage of a crash, said measuring starts when said accelerometer initially develops a deceleration signal; and adjusting means for adjusting at least one of the following two parameters to be used in said comparator means in accordance with said magnitude of physical quantities in said first wave;

(a) said subtracted integral value and (b) said another prescribed function varying with time.

5. A crash sensor as defined in any of claims 1 to 4, wherein said physical quantity calculation means comprises:

extracting means for extracting a first wave from said acceleration signal, said first wave being defined by acceleration signals as measured during times when a sign of a variation regarding said acceleration signals changes and then becomes zero again in an initial stage of a crash, said measuring starts when said accelerometer initially develops a deceleration signal; and means for calculating a magnitude of physical quantities in said extracted first wave;

said physical quantities being defined as at least one of the following nine parameters;

(a) average acceleration in said first wave (b) maximum acceleration developed in said first wave (c) maximum variation of said acceleration in said first wave (d) speed in said first wave (e) energy in said first wave (f) mean value of variation of said acceleration in said first wave (g) variation of said acceleration until a moment when a peak acceleration occurs in said first wave (h) time until a moment when said peak acceleration occurs in said first wave and (i) duration of said first wave.

6. A crash sensor as defined in any of claims 1 to 4, wherein said acceleration signal is fed to said physical quantity calculation means after passage through a low-pass filter which allows only said acceleration signal less than a prescribed frequency to pass through.

7. A crash sensor as defined in any one of claims 1 to 4, wherein said protective device comprises an air bag.

* * * * *